United States Patent [19]

Cronk et al.

[11] 4,372,506
[45] Feb. 8, 1983

[54] LANDING GEAR FOR ULTRALIGHT AIRCRAFT

[76] Inventors: David Cronk, 1069 Eucalyptus Ave., Vista, Calif. 92025; Lyle M. Byrum, 1471 Calle Redonda, Escondido, Calif. 92026

[21] Appl. No.: 156,768

[22] Filed: Jun. 5, 1980

[51] Int. Cl.³ .......................................... B64C 25/04
[52] U.S. Cl. ................................. 244/100 R; 244/13; 244/DIG. 1
[58] Field of Search ............... 244/100 R, 13, DIG. 1, 244/16, 120, 117 R

[56] References Cited

U.S. PATENT DOCUMENTS

| D. 243,594 | 3/1977 | Koch | 244/DIG. 1 |
| 1,022,903 | 4/1912 | Warrick | 244/DIG. 1 |
| 1,056,844 | 3/1913 | Simpson | 244/100 R |
| 2,818,226 | 12/1957 | Hiller et al. | 244/120 |

OTHER PUBLICATIONS

Poynter, Dan, "Hang Gliding", ©1976, pp. 176-177.

*Primary Examiner*—Galen L. Barefoot
*Attorney, Agent, or Firm*—Brown & Martin

[57] ABSTRACT

A landing gear for ultralight aircraft includes a main landing gear assembly disposed in a position relative to the longitudinal axis of the aircraft to permit either tail wheel type landing or tricycle landing operations with the assembly including an arched axle wherein the arch provides a spring for the landing gear as well as provides clearance to enable foot launching of the aircraft. A nose wheel strut assembly is linked to and extends forward of the main wheel landing gear assembly and includes a resilient tension link member.

10 Claims, 4 Drawing Figures

LANDING GEAR FOR ULTRALIGHT AIRCRAFT

BACKGROUND OF THE INVENTION

The present invention relates to light aircraft and pertains particularly to landing gear assembly for ultralight foot launchable aircraft.

Ultralight aircraft, typically referred to as hang gliders, have been known for a long time, since at least as early as the early days of manned flight. Such hang gliders are normally foot launched and do not include landing gear structure.

Many of such ultralight aircraft have been modified in recent years to accept small internal combustion engines resulting in the aircraft becoming a powered aircraft. Such aircraft must have some support assembly somewhat similar to landing gear; and it is desirable that such aircraft also be capable of being foot launchable and foot landed, as well as wheel landed. It is desirable to have tricycle landing gear for such aircraft, yet have the aircraft still capable of foot launching.

SUMMARY AND OBJECTS OF THE INVENTION

Accordingly, it is the primary object of the present invention to provide improved landing gear for ultralight aircraft.

In accordance with the primary aspect of the present invention the landing gear assembly for ultralight aircraft includes a main gear strut assembly including an arched axle permitting clearance for foot launching and providing resilient suspension for the aircraft.

BRIEF DESCRIPTION OF A PREFERRED EMBODIMENT

The above and other objects and advantages of the present invention will become apparent from the following description when read in conjunction with the drawings wherein.

DETAILED DESCRIPTION OF THE PREFERRED EMBODIMENT

Figure 1:
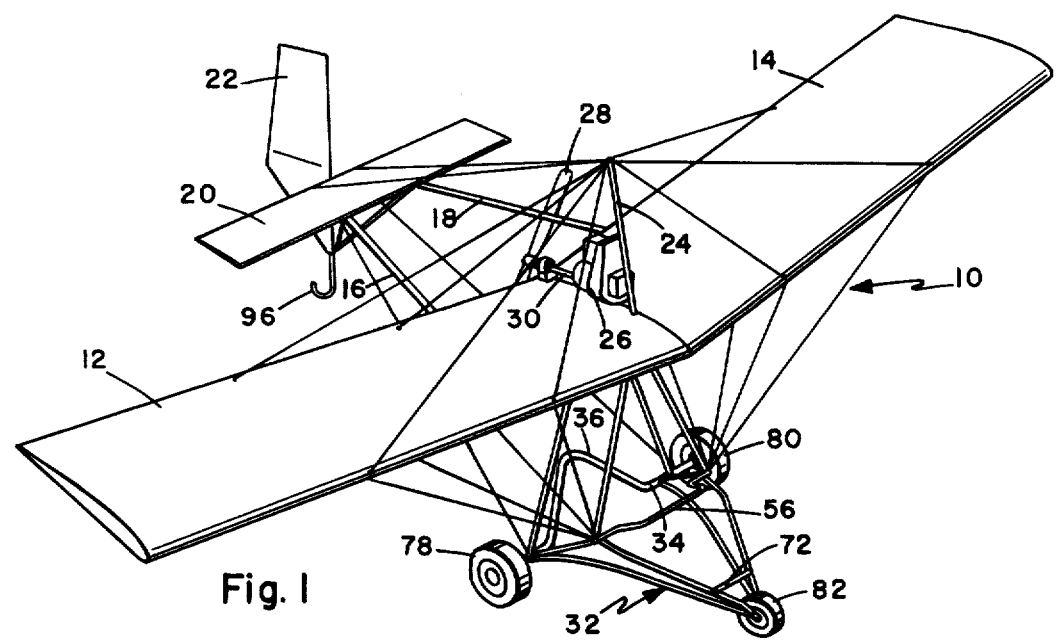
FIG. 1 is a perspective view of a powered hang glider or ultralight aircraft incorporating the present invention.

Turning to FIG. 1 of the drawings, there is illustrated an ultralight aircraft incorporating a landing gear of the present invention. The ultralight aircraft generally designated by the numeral 10 comprises a pair of wings 12 and 14 forming the major portion of the chassis of airframe and including a pair of rearward extending booms 16 and 18 for supporting a tail section. The booms 16 and 18 extend to the rear and support a horizontal tail surface 20 and a vertical stabilizer and rudder assembly 22.

A great deal of the support of the airframe is by means of a plurality of strategically located and positioned tension wires or cables which connect at the top end of a vertically adjustable tower or post 24. As will be appreciated, the aircraft is not provided with the usual ailerons and elevators, with the pitch and yaw of the aircraft achieved or controlled by the shifting of the weight of the pilot or operator as will be further discussed. The aircraft is designed to support a single individual suspended from the airframe in a harness structure from beneath the main wing structure.

Figure 2:
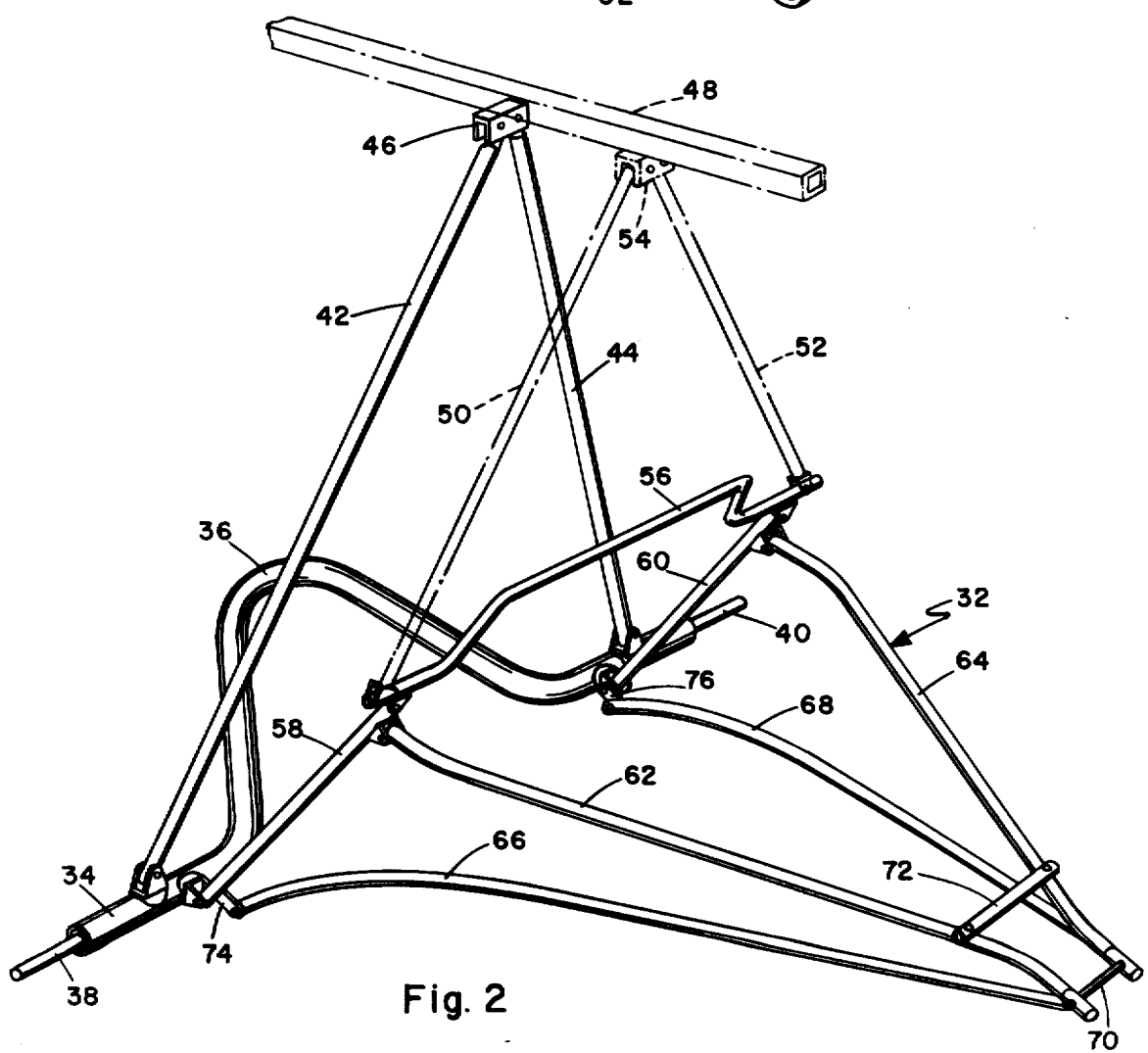
FIG. 2 is an enlarged perspective view of the landing gear frame, a portion of the existing structure being indicated in broken lines.

The illustrated aircraft has been modified to a powered aircraft configuration by the provision of an air cooled engine 26 mounted on top of the wing structure and driving a propeller 28 through a drive shaft 30. The propeller 28 is positioned aft of the trailing edge of the wings 12, 14 and is arranged in essentially a pusher prop configuration. In order to accommodate the weight of the engine and to hold the aircraft in a convenient position, a landing gear structure is provided. This landing gear structure designated generally by the numeral 32 and best illustrated in FIG. 2, consists of a main gear or landing gear axle 34 having an arched central portion 36 and a pair of coaxially positioned spaced apart wheel journal portions 38 and 40. A pair of upwardly extending struts 42 and 44 are pinned at their lower ends to the axles adjacent the ends thereof in suitable brackets as illustrated. The struts 42 and 44 are pinned at their upper ends in a channel bracket 46 secured to the main or central wing rib 48. The struts 42, 44 together with the axle 34, define a generally triangular configuration depending downward from the central or lower portion and just aft of the center of gravity of the aircraft.

The nose wheel strut and landing gear assembly includes a pair of downwardly depending struts 50, 52, which are pinned close together at their upper ends to a channel bracket 54 which is also connected to the wing rib or spar 48 forward of the connection of the main landing gear strut assembly. The struts 50 and 52 are connected at their lower ends to the outer ends of a cross tube or bar 56 which forms the basic hand lifting and manipulating or control member for the aircraft. This arrangement of strut members 50 and 52 will be hereinafter called the upper triangular strut assembly. This cross bar 56 has a central upwardly curved portion with side angled portions to provide ease of hand holding and manipulation.

A pair of link members 58 and 60 are pinned at their upper ends to the cross bar 56 at opposite ends thereof and at lower ends to the axle 34. As will be appreciated from FIG. 1, a plurality of tension cables are secured at various positions along the wings 12, 14 and to the outer ends of the cross bar 56. Similarly, tension cables or members are secured to the outer ends of the axle 34 and to the tail end of the airframe structure. Thus, a girder bridge work construction assembly is provided.

The nose wheel assembly further includes a pair of forwardly extending triangular linkage or strut assemblies, each including an upper compression member 62, 64 and a lower tension member 66, 68 which are connected together at the forward end and include an axle 70 extending therebetween for rotatably mounting a nose wheel. A foot bar 72 extends between the upper compression members 62, 64 aft of the nose wheel position. The tension links 68 are curved as will be appreciated from FIGS. 3, 4 and 2 to provide a spring for the nose wheel assembly. The tension members 66, 68 are further pivotally connected by pivot link members 74 and 76 to the forward end of axle 34. This provides additional slack in the linkage to accommodate movement of the nose wheel.

Turning now to FIG. 1, a pair of main landing gear wheels 78 and 80 are respectively mounted on the ends 38 and 40 of the axle 34. A nose wheel 82 is mounted on the nose wheel axle 70. Thus, essentially a tricycle landing gear arrangement is provided.

Figure 3:
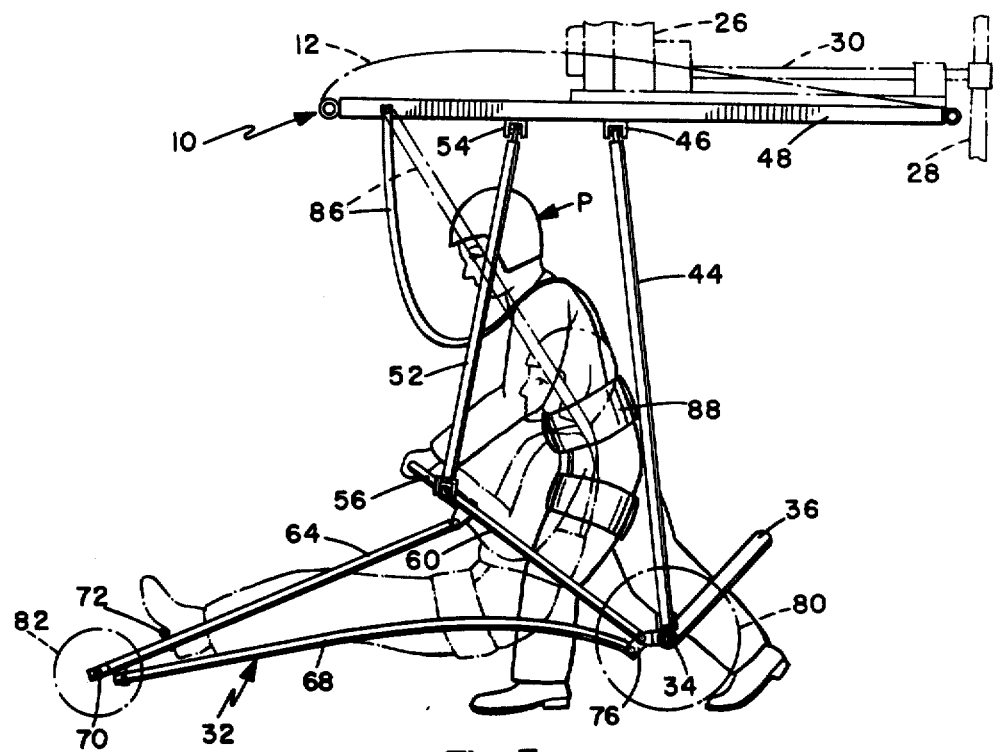
FIG. 3 is a side elevation view of the landing gear and wing root structure showing the ground and flight position of the pilot.
Figure 4:
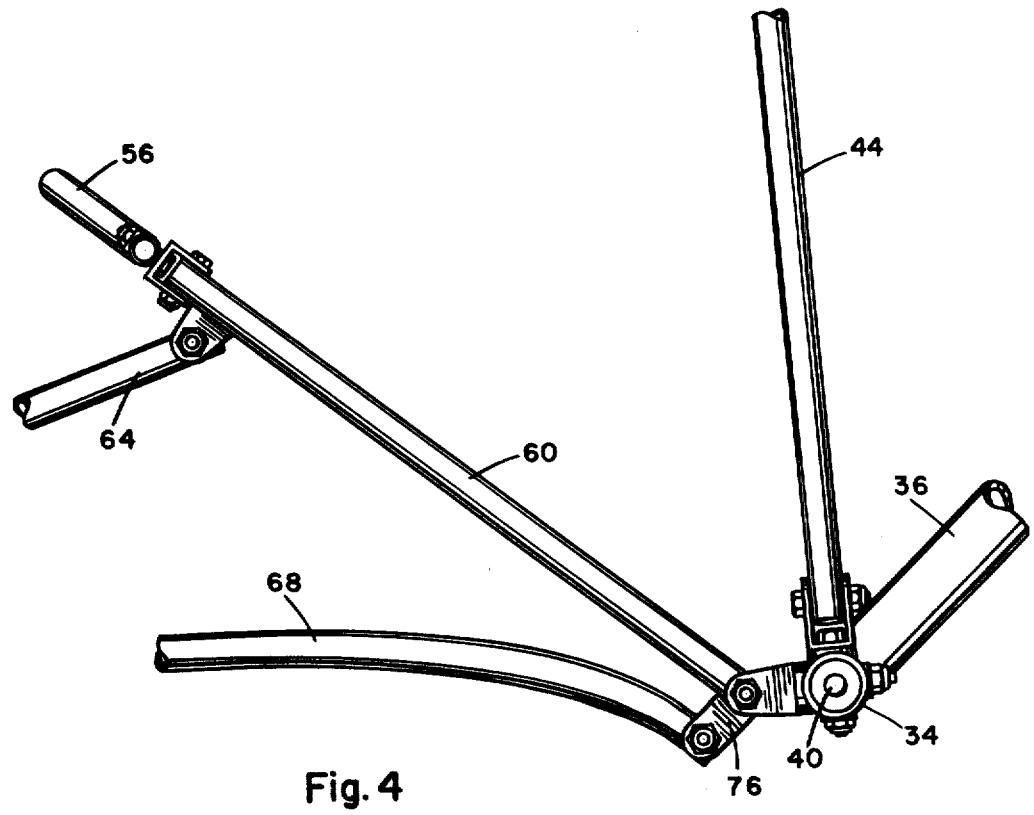
FIG. 4 is an enlarged side elevation view of a portion of the landing gear.

Turning to FIG. 3 of the drawing there is illustrated a pilot P shown in the standing position for launching the aircraft and shown in phantom in the seated position for in-flight control of the aircraft. The pilot P is supported by means of a sling structure or harness assembly including a sling 86 and a harness 88 which straps around the legs and waist of the pilot.

As will be seen in FIG. 3, the pilot P in the standing position, upon launching of the aircraft by foot launching, lifts the aircraft by the cross bar 56 and walks or runs forward with the aircraft as the engine power is increased. Once sufficient airspeed has been attained, the aircraft will lift off supporting the pilot in flight. The arched portion or curvature 36 of the main landing gear axle, as will be seen in FIG. 3, lies in a plane substantially 45 degrees from the horizontal or between the vertical and horizontal. This provides clearance for the legs of the pilot, enabling him to take reasonable strides during launch of the aircraft or during landing thereof and simultaneously provides a resilient support of the main landing gear. The arched structure permits the wheels to have a resilience upon landing with the axle serving substantially as a spring. The above described structures are preferably made of high strength lightweight aluminum tubing or similar suitable material.

An additional feature of the present landing gear is the forward positioning thereof for a tricycle gear permits the aircraft to be landed in a so-called tail dragger configuration. In such configuration, the addition or provision of a tail skid 96 as shown in FIG. 1, is necessary. With this arrangement, the pilot may simply shift his weight aft of the center of gravity of the aircraft, easily forcing the aircraft to land nose high and make essentially a three point landing on the tail skid 96 and main landing gear wheel 78, 80. As previously discussed, the pilot controls the pitch and roll of the aircraft, simply by shifting his weight either fore and aft for altering the pitch, or to either side for altering the roll, to thereby steer and control the aircraft.

From the above description it will be seen that I have provided an improved landing gear assembly for powered ultralight aircraft. While I have illustrated and described my invention by means of a specific embodiment, it is to be understood that numerous changes and modifications may be made therein without departing from the spirit and scope of the invention as defined in the appended claims.

We claim:

1. A landing gear assembly for light winged aircraft, said gear comprising:
   an elongated main axle having a wheel on each end and arch intermediate the ends;
   a pair of elongated main struts, each connected at an upper end to the airframe of an aircraft and at the lower end to said axle adjacent an end thereof, said struts forming with said axle a generally triangular configuration;
   a hand control cross bar disposed above and forward of said axle;
   a pair of upper downwardly depending struts, each connected at an upper end to the airframe and at the lower end to an outer end of said cross bar, and
   a pair of forward link members, each connected at a lower end to the main axle at one end thereof and extending upwardly and forwardly and connected to an end of said cross bar.

2. The landing gear assembly of claim 1 wherein said arch of said axle extends upward behind the axis of the wheels thereon and lines in a plane between the horizontal and the vertical tubular member.

3. A landing gear assembly for light winged aircraft, said gear comprising:
   an elongated main axle having a wheel on each end and arch intermediate the ends;
   a pair of elongated main struts, each connected at an upper end to the airframe of an aircraft and at the lower end to said axle adjacent an end thereof, said struts forming with said axle a generally triangular configuration,
   a nose wheel assembly, said nose wheel assembly comprising a pair of upper downwardly depending struts, each connected at an upper end to the airframe and at the lower end to an outer end of a cross bar, and
   a pair of forward triangular struts connected to the main axle at each end thereof and extending forwardly to an end of a nose wheel axle.

4. The landing gear assembly of claim 3 wherein said forward struts each comprise an upper compression member and a lower tension member, said lower tension member comprises a curved tubular member.

5. The landing gear of claim 4 wherein said tension member has an inner end connected by a pivoting link to the main axle.

6. The landing gear of claim 5 wherein said main gear is disposed just aft of the center of gravity and the aircraft includes a tail skid.

7. The landing gear of claim 4 wherein said main landing gear struts extend substantially vertically in side elevation, and include closely spaced connection of the upper ends to the airframe and distal spaced connections of the lower ends so that said struts and said axle defines a triangle in front elevation view, and
   a plurality of tension cables connected to said strut assembly and to the airframe for securing said landing gear in place.

8. The landing gear of claim 7 wherein said forward triangular struts include first and second link members connected at a lower end to opposite ends of said main axle and at an upper end to said cross bar, and one end of each of said compression members is connected to the upper end of one of said link members.

9. The landing gear of claim 8 wherein said link members are each disposed forward of said main axle at an angle of between 30 and 60 degrees to said cross bar.

10. The landing gear of claim 8 wherein said compression members extend downward at an angle to the horizontal to the front axle, and a foot bar extends between and is connected at each end to one of said compression members.

* * * * *